(12) United States Patent
Park et al.

(10) Patent No.: US 10,437,766 B2
(45) Date of Patent: Oct. 8, 2019

(54) DATA STORAGE DEVICE INCLUDING TRANSMISSION LINE HAVING OPEN STUB AND METHOD OF OPERATING THE SAME

(71) Applicant: Samsung Electronics Co., Ltd., Suwon-si (KR)

(72) Inventors: Ji-Woon Park, Suwon-si (KR); Sun-Ki Yun, Yongin-si (KR); Kwang-Soo Park, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 146 days.

(21) Appl. No.: 15/623,743

(22) Filed: Jun. 15, 2017

(65) Prior Publication Data

US 2018/0018294 A1    Jan. 18, 2018

(30) Foreign Application Priority Data

Jul. 18, 2016  (KR) .......................... 10-2016-0090524

(51) Int. Cl.
*G06F 13/14* (2006.01)
*G06F 13/40* (2006.01)
*G06F 13/16* (2006.01)

(52) U.S. Cl.
CPC ...... *G06F 13/4068* (2013.01); *G06F 13/1668* (2013.01); *G06F 13/409* (2013.01)

(58) Field of Classification Search
CPC . G06F 13/1668; G06F 13/4068; G06F 13/409
See application file for complete search history.

(56) References Cited

U.S. PATENT DOCUMENTS

| 6,349,051 | B1 * | 2/2002 | Klein ................. G06F 13/1684 365/51 |
| 8,009,104 | B2 | 8/2011 | Hossain |
| 8,559,235 | B2 * | 10/2013 | Yoon ................. G11C 16/0483 365/185.29 |
| 8,586,873 | B2 | 11/2013 | Wu |
| 9,160,046 | B2 | 10/2015 | Ao et al. |
| 9,456,489 | B2 * | 9/2016 | Kikuchi ............... G11C 29/023 |

(Continued)

FOREIGN PATENT DOCUMENTS

KR    10-0814375    3/2008

*Primary Examiner* — Idriss N Alrobaye
*Assistant Examiner* — Richard B Franklin
(74) *Attorney, Agent, or Firm* — Muir Patent Law, PLLC

(57) ABSTRACT

A data storage device is provided. The data store device includes a first printed circuit board (PCB) comprising a main transmission line formed on at least one surface of the first PCB and/or within the first PCB, a memory controller and a plurality of nonvolatile memory devices. The memory controller is provided on the first PCB. The plurality of nonvolatile memory devices are provided on the first PCB. The plurality of nonvolatile memory devices are connected to the memory controller through a channel and exchange data with the memory controller. The channel includes a data transmission line connecting data pads of the memory controller and the nonvolatile memory devices. The data transmission line comprises the main transmission pattern and an open stub contacting the main transmission pattern. The open stub does not contact any other conductor other than the main transmission pattern.

19 Claims, 15 Drawing Sheets

(56) References Cited

U.S. PATENT DOCUMENTS

| | | |
|---|---|---|
| 2004/0207496 A1 | 10/2004 | Lee et al. |
| 2012/0055016 A1 | 3/2012 | Gorcea |
| 2014/0016686 A1 | 1/2014 | Artsi |
| 2014/0264904 A1 | 9/2014 | Fai et al. |
| 2015/0371698 A1* | 12/2015 | Mizuno .................. G06F 13/16 365/51 |
| 2016/0079950 A1 | 3/2016 | Cheng et al. |

* cited by examiner

DATA STORAGE DEVICE INCLUDING TRANSMISSION LINE HAVING OPEN STUB AND METHOD OF OPERATING THE SAME

CROSS-REFERENCE TO RELATED APPLICATIONS

This US application claims the benefit of priority under 35 USC § 119 to Korean Patent Application No. 10-2016-0090524, filed on Jul. 18, 2016, in the Korean Intellectual Property Office, the content of which is incorporated in its entirety by reference herein.

BACKGROUND

The present disclosure relates to memory devices, and more particularly to data storage devices and methods of operating the same.

Semiconductor memory devices may be typically classified into volatile semiconductor memory devices and nonvolatile semiconductor memory devices. Volatile semiconductor memory devices may perform read and write operations at high speed, while contents stored therein may be lost when the devices are powered-off. Nonvolatile semiconductor memory devices may retain contents stored therein even when powered-off. For this reason, nonvolatile semiconductor memory devices may be used to store contents to be retained regardless of whether the devices are powered on or off.

A flash memory device is one type of nonvolatile memory device. Flash memory devices are widely used as voice and image data storage media in information processing devices, such as solid state drives, computers, handheld telephones, smart phones, digital cameras, camcorders, voice recorders, MP3 players, PDAs, handheld PCs, game consoles, facsimile machines, scanners, and printers. For the past several years, techniques have been developed to provide high-capacity, high-speed input/output and low-power nonvolatile memory devices in solid state drives or mobile devices (e.g., smart phones).

High-capacity and high-speed input/output solutions may be achieved by means of multi-stack chip packages wherein a plurality of nonvolatile memories are connected through the same channel. Reliability of such a data storage system may be reduced due to resistance and parasitic capacitance of unselected nonvolatile memories when performing a read, write or copy-back operation on a selected device. Thus, it is desired to improve the reliability of the data storage system including a plurality of nonvolatile memories connected with each other through the same channel.

SUMMARY

Some exemplary embodiments provide a data storage device, capable of enhancing performance.

Some exemplary embodiments provide a method of operating a data storage device, capable of enhancing performance.

According to some exemplary embodiments, a data storage device includes a first printed circuit board (PCB), a memory controller and a plurality of nonvolatile memory devices. The first PCB includes a main transmission line formed on at least one surface of the first PCB and/or within the first PCB. The memory controller is provided on the first PCB. The plurality of nonvolatile memory devices are provided on the first PCB. The plurality of nonvolatile memory devices are connected to the memory controller through a channel and exchange data with the memory controller. The channel includes a data transmission line connecting data pads of the memory controller and the nonvolatile memory devices. The data transmission line includes the main transmission pattern and an open stub contacting the main transmission pattern. The open stub does not contact any other conductor other than the main transmission pattern.

According to some exemplary embodiments, in a method of operating a data storage device, a memory controller and a plurality of nonvolatile memory devices are provided on a first printed circuit board (PCB), a data transmission line electrically connecting the memory controller and the nonvolatile memory devices is provided on the first PCB and the data transmission line includes a main transmission pattern and at least a first open stub. Data is transmitted to at least one of the nonvolatile memory devices from the memory controller through the data transmission line. The first open stub extends in a second direction at a first position of the data transmission line which extends in a first direction perpendicular to the second direction. The first position of the data transmission line is closer to the memory controller than the nonvolatile memory devices. The first open stub includes one end electrically connected to the first position of the data transmission line and one end open.

According to some exemplary embodiments, a data storage device includes a first printed circuit board (PCB) including a main transmission line, a memory controller a memory controller provided on the first PCB, a plurality of memory devices provided on the first PCB, and connected to the memory controller through a transmission line comprising the main transmission line, a branch transmission line and an open stub. The main transmission line extends in a first direction, and has a first end connected to the memory controller and a second end connected to the plurality of memory devices through the branch transmission line. The open stub extends in a second direction different from the first direction, and has a first end connected to the main transmission line at a first position of the main transmission line and a second end open. The first position is closer to the memory controller than at least one of the plurality of memory devices, or is closer to at least one of the plurality of memory devices than the memory controller.

Accordingly, a data storage device includes a data transmission line connecting a memory controller and a plurality of nonvolatile devices, which includes at least one open stub, and thus signal integrity of the data storage device may be enhanced.

BRIEF DESCRIPTION OF THE DRAWINGS

Exemplary embodiments will be described below in more detail with reference to the accompanying drawings.

DETAILED DESCRIPTION

Figure 1:
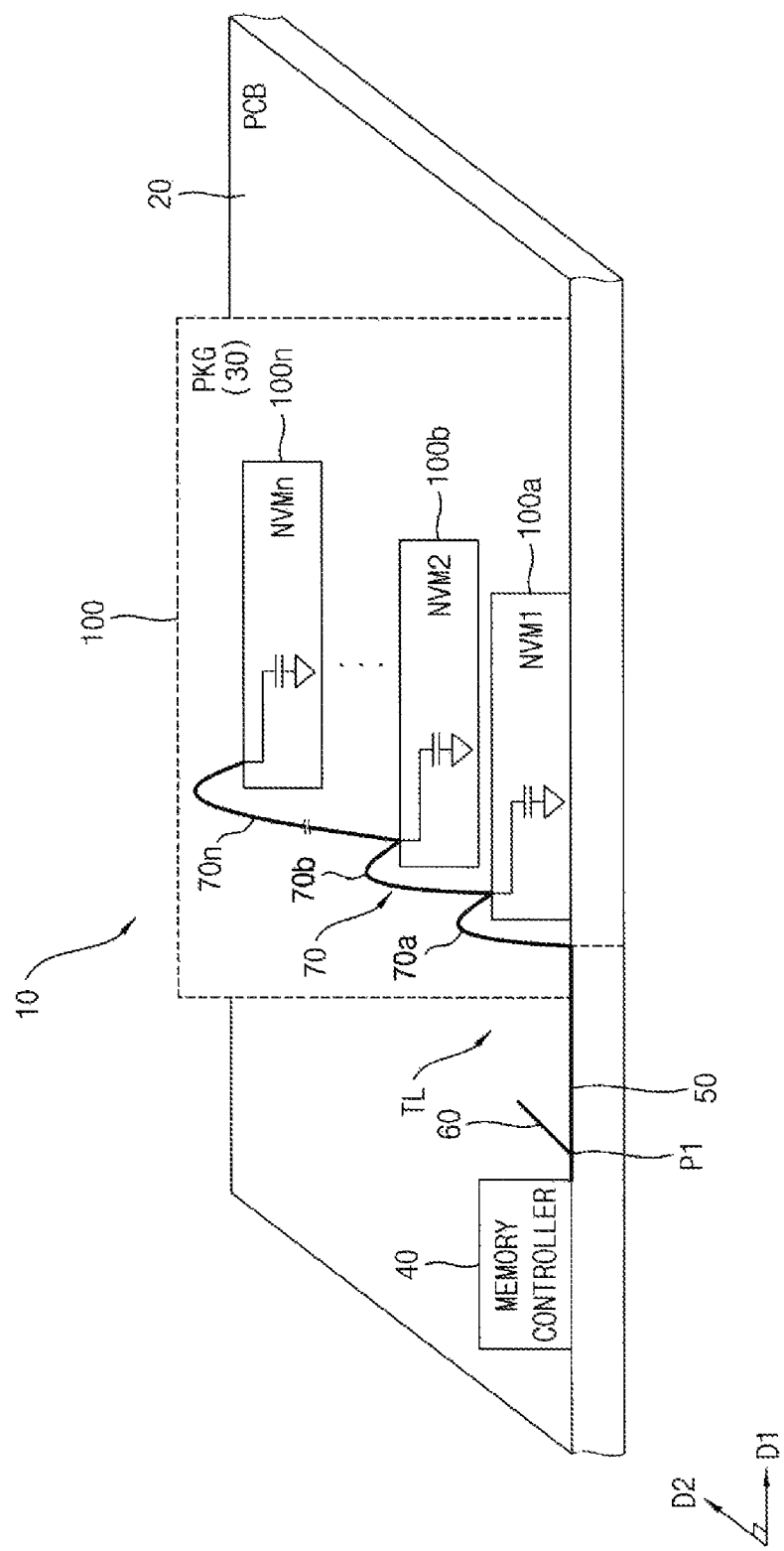
FIG. 1 is a block diagram illustrating a data storage device according to exemplary embodiments.

Various exemplary embodiments will be described more fully hereinafter with reference to the accompanying drawings, in which some exemplary embodiments are shown.

It will be understood that, although the terms first, second, third etc. may be used herein to describe various elements, these elements should not be limited by these terms. Unless indicated otherwise, these terms are generally used to distinguish one element from another. Thus, a first element discussed below in one section of the specification could be termed a second element in a different section of the specification without departing from the teachings of the present disclosure. Also, terms such as "first" and "second" may be used in the claims to name an element of the claim, even thought that particular name is not used to describe in connection with the element in the specification. As used herein, the term "and/or" includes any and all combinations of one or more of the associated listed items. Expressions such as that, although the terms first, second, third etc. may be used herein to describe various elements, these elements should elements of the list.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. For example, items described as "substantially the same," "substantially equal," or "substantially planar," may be exactly the same, equal, or planar, or may be the same, equal, or planar within acceptable variations that may occur, for example, due to manufacturing processes.

A data storage device including a plurality of nonvolatile memory devices according to exemplary embodiments may increase signal integrity when a program operation is performed on at least one of the nonvolatile memory devices because a data transmission line includes at least one open stub pattern, which transmits data between a memory controller and the nonvolatile memory devices.

A nonvolatile memory device according to exemplary embodiments may be a NAND flash memory, a vertical NAND flash memory (VNAND), a NOR flash memory, a resistive RAM (RRAM), a phase-change RAM (PRAM), a magnetoresistive RAM (MRAM), an STT-RAM (Spin Transfer Torque Random Access Memory), or the like. Also, the nonvolatile memory device may be implemented to have a three-dimensional array structure. At least some exemplary embodiments are applicable to not only a flash memory device where a charge storage layer is formed of a floating gate, but also a charge trap flash (CTF) memory where a charge storage layer is formed of an insulation film. Below, it is assumed that a nonvolatile memory device is a NAND flash memory device.

FIG. 1 is a block diagram illustrating a data storage device according to exemplary embodiments.

Referring to FIG. 1, a data storage device 10 may include a memory controller 40 and a nonvolatile memory device 100 including a plurality of nonvolatile memory devices 100a~100n provided on a printed circuit board (PCB) 20.

The memory controller 40 and the nonvolatile memory devices 100a~100n may be electrically coupled to each other through a transmission line TL. The nonvolatile memory devices 100a~100n may be other type of memory devices such as, a dynamic random access memory (DRAM), a static random access memory (SRAM), a mobile DRAM, a ferroelectric random access memory (FRAM), etc. The transmission line TL may be a data transmission line (or data input/output (I/O) line) or other type of a signal transmission line (e.g., to transmit address and/or control signals). The data transmission line may use to transfer data between the memory controller 40 and the plurality of nonvolatile memory devices 100a~100n. The signal transmission line may use to transfer a signal, such as a control signal, an address signal, a command signal, etc. between the memory controller 40 and the plurality of nonvolatile memory devices 100a~100n.

In example embodiments, the nonvolatile memory devices 100a~100n may be other type of memory devices such as, a dynamic random access memory (DRAM), a static random access memory (SRAM), a mobile DRAM, a ferroelectric random access memory (FRAM), etc.

The transmission line TL may include a main transmission pattern (or, a main transmission line) 50, a branch transmission pattern (or, a branch transmission line) 70 and at least one open stub 60. The main transmission pattern 50 may be electrically connected to the memory controller 40, and the branch transmission pattern 70 may be branched from the main transmission pattern 50 and may be connected respectively to the nonvolatile memory devices 100a~100n. A first end of the main transmission pattern 50 is contacted the memory controller 40 and a second end of the main transmission pattern 50 is contacted the branch transmission pattern 70.

In example embodiments, the at least one open stub 60 may extend to a second direction D2 at a first position P1 in the main transmission pattern 50 which extends in a first direction D1 perpendicular to the second direction D2.

A stub refers to a protrusion or a protruding piece, and the open-stub 60 in the transmission line TL refers to a line other than a signal line that is additionally connected to the transmission line TL. Here, when one end of the stub is not connected to another transmission line, it is referred to as the open stub 60, and when one end of the stub is connected to a ground line, it is referred to as a short stub.

As shown in FIG. 1, a first end of the open stub 60 is connected to the main transmission pattern 50 and a second end of the open stub 60 open. In detail, the first end of the open stub 60 is connected to the main transmission pattern 50 at a first position of the main transmission pattern 50. The first position is closer to the memory controller 40 than at least one of the nonvolatile memory devices 100a~100n. In this case, the transmission line may be a data transmission line for transferring data or a signal transmission line for transferring a control signal or an address signal from the memory controller 40 to one of the plurality of memory devices 100a~100n. The data transmission line may be connected to data pads of the memory controller 40 and the nonvolatile memory devices. Signal chip pads (or data pads) of a chip are those chip pads connected to internal circuitry (e.g., appropriate I/O buffers, internal clock generators, latches, etc.) of the chips to send and/or receive information or timing control (such as data, address and control information and clock signals) with respect to an external source (e.g., another chip).

In example embodiments, the first end of the open stub 60 may be connected to the main transmission pattern 50 at a second position (not shown) of the main transmission pattern 50. The second position is closer to at least one of the nonvolatile memory devices 100a~100n than the memory controller 40. In this case, the transmission line may be used to transfer data or a signal from one of the plurality of memory devices 100a~100n to the memory controller 40.

The branch transmission pattern 70 may be formed of one or more wires respectively connected to the nonvolatile memory devices 100a~100n. For example, branch transmission pattern 70 may include a first branch wire 70a, a second branch wire 70b, . . . , and nth branch wire 70n. A first end of the first branch wire 70a is connected to the main transmission pattern 50 and a second end of the first branch wire 70a is connected to the first nonvolatile memory device 100a and a first end of the second branch wire 70b. A second end of the second branch wire 70b is connected to the second nonvolatile memory device 100b and a first end of the third branch wire 70c. Only illustrated are the memory controller 40 and the nonvolatile memory device 100 including the nonvolatile memory devices 100a~100n but the data storage device 10 may further include other components (e.g., a power management device, etc.).

The data storage device 10 may include flash memory based data storage media such as a memory card, a smart card, a universal serial bus (USB) memory, a solid state drive (SSD).

The nonvolatile memory device 100 may be formed in one package 30 contains the nonvolatile memory devices 100a~100n. If the nonvolatile memory devices 100a~100n are contained in the package 30 in the form of multi-stack chip, the stacked nonvolatile memory devices 100a~100n are connected to the memory controller 40 through the same channel. When a nonvolatile memory device 100a from which data is to be read or to which data is to be written is selected when a command associated with a read or write operation is received from a host (not shown), capacitance of the channel may include parasitic capacitance of unselected nonvolatile memory devices 100b~100n that are not associated with a read or write operation or a copy-back operation, etc.

In example embodiments, the package 30 may comprise a package-on-package device including a plurality of packages. In this case, the plurality of packages respectively include one of the nonvolatile memory devices 100a~100n.

In example embodiments, the nonvolatile memory devices 100a~100n may be arranged at the same vertical level on the PCB 20. Each of the nonvolatile memory devices 100a~100n is connected to the memory controller 40 through one or more conductive pattern disposed on the PCB 20. In this case, the branch transmission pattern 70 may be formed of a similar material to the main transmission pattern 50.

In example embodiments, the nonvolatile memory devices 100a~100n may be arranged in a type of chips or dies on a unifying substrate of a multi-chip module (MCM). In this case, additional circuits (e.g., discrete components, multiple integrated circuits, etc.) may be arranged on the unifying substrate of the MCM.

In terms of signal integrity, the parasitic capacitance influences data transmission through the channel. It is assumed that the nonvolatile memory devices 100a~100n are connected to the same channel and write data is transmitted to a nonvolatile memory. When a reflection coefficient between the nonvolatile memory devices 100a~100n and the channel is '0', data to be transmitted to a nonvolatile memory may be transferred to the nonvolatile memory without reflection. The reflection coefficient is expressed by the following equation:

$$\Gamma=(Zr-Z0)/(Zr+Z0) \qquad \text{[Equation 1]}$$

In Equation 1, 'Zr' indicates impedance of the nonvolatile memory devices 100a~100n and 'Zo' indicates self-impedance of the channel. Theoretically, reflection may not occur when a value of impedance of the nonvolatile memory devices 100a~100n is equal to that of self-impedance of the channel. Parasitic capacitance of nonvolatile memories connected to the same channel increases in proportion to an increase in the number of nonvolatile memories connected to the same channel. In this case, probability that signals transmitted to the nonvolatile memory devices 100a~100n from the memory controller 40 are reflected may become higher. Since signals are distorted due to reflection or impedance mismatch, it is desirable to make a measured reactance value of a channel have a predetermined value. Practically, capacitance is mainly associated with the number of nonvolatile memories, and inductance is largely associated with a physical length of the channel.

In exemplary embodiments, in the data storage device 10, the transmission line TL includes at least one open stub 60, which electrically connects the memory controller 40 and the nonvolatile memory devices 100a~100n. Therefore, the self-impedance of the channel Zo increases, and thus reflection coefficient $\Gamma$ is decreased to decrease reflection phenomenon. Since the at least one open stub also reflects signals, signals from the memory controller 40 may be effectively delivered to the nonvolatile memory devices 100b-100n.

Since the transmission line TL includes at least one open stub 60, which electrically connects the memory controller 40 and the nonvolatile memory devices 100a~100n, signal transmission characteristic is enhanced when the memory controller 40 transmits data to at least one of the nonvolatile memory devices 100a~100n. Therefore, a write margin of a nonvolatile memory device of the nonvolatile memory devices 100a~100n, which performs a program operation may be increased.

Figure 2:
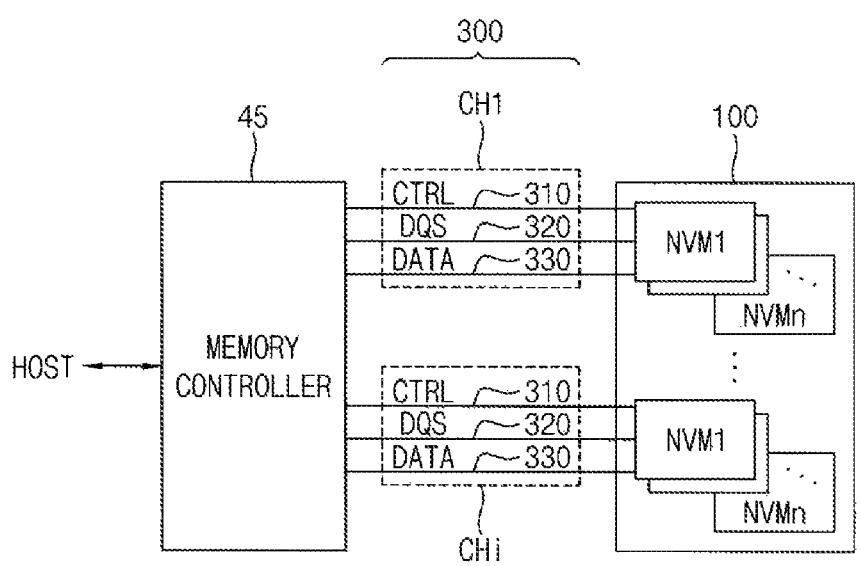
FIG. 2 is a block diagram illustrating a data storage device according to exemplary embodiments.

FIG. 2 is a block diagram illustrating a data storage device according to exemplary embodiments.

Referring to FIG. 2, a data storage device 15 may include nonvolatile memory devices 100, a memory controller 45 and signal lines 300 connecting the nonvolatile memory devices 100 and the memory controller 45.

The nonvolatile memory devices 100 may be arranged in the form of a multi-stack chip. A set of nonvolatile memory devices of a multi-stack chip may be connected to the memory controller 45 through the same channel (e.g., first channel CH1). If the number of channels is 'i' (i is a natural number greater than 1), 'i' sets of nonvolatile memory devices are provided.

The memory controller 45 reads or writes data from or to the nonvolatile memory devices 100 in response to a read or write request from the host. Exchanging data with the nonvolatile memory devices 100, the memory controller 45 may use a data strobe signal DQS. The data strobe signal DQS is used to provide a reference point in time when a logical value of input/output data exchanged between the nonvolatile memory devices 100 and the memory controller 45 is decided. In some embodiments, the memory controller 45 may not use the data strobe signal DQS.

The signal lines 300 provide a plurality of channels. Each channel may contain control signal lines 310, a DQS line 320, and data transmission lines 330. In other embodiments, each channel may not include the DQS line. Control signals (e.g., /CE, /RE, /WE, etc.) provided from the memory controller 45 to control the nonvolatile memories 100 are transferred through the control signal lines 310. A data strobe signal DQS is transferred through the DQS line 320. Data DATA is transmitted through the data transmission lines 330.

In a data storage device 15 according to exemplary embodiments, each nonvolatile memory device may contain a data input/output switch. The data storage device 15 may turn the data input/output switch of an unselected nonvolatile memory (i.e., a nonvolatile memory device that is not associated with a particular read, write or copy-back operation, etc.) on or off. Adjustment is made under a control of the data storage device 15 such that a capacitance value of a channel satisfies a predetermined criterion, for example, such that the capacitance value substantially equals a reference value. For example, when the measured capacitance value of the channel exceeds the reference value, data input/output switches of unselected nonvolatile memory devices may be turned off such that the capacitance value of the channel substantially equals the reference value. When the measured capacitance value of the channel is smaller than the reference value, data input/output switches of unselected nonvolatile memory devices may be turned on such that the capacitance value of the channel substantially equals the reference value.

Figure 3:
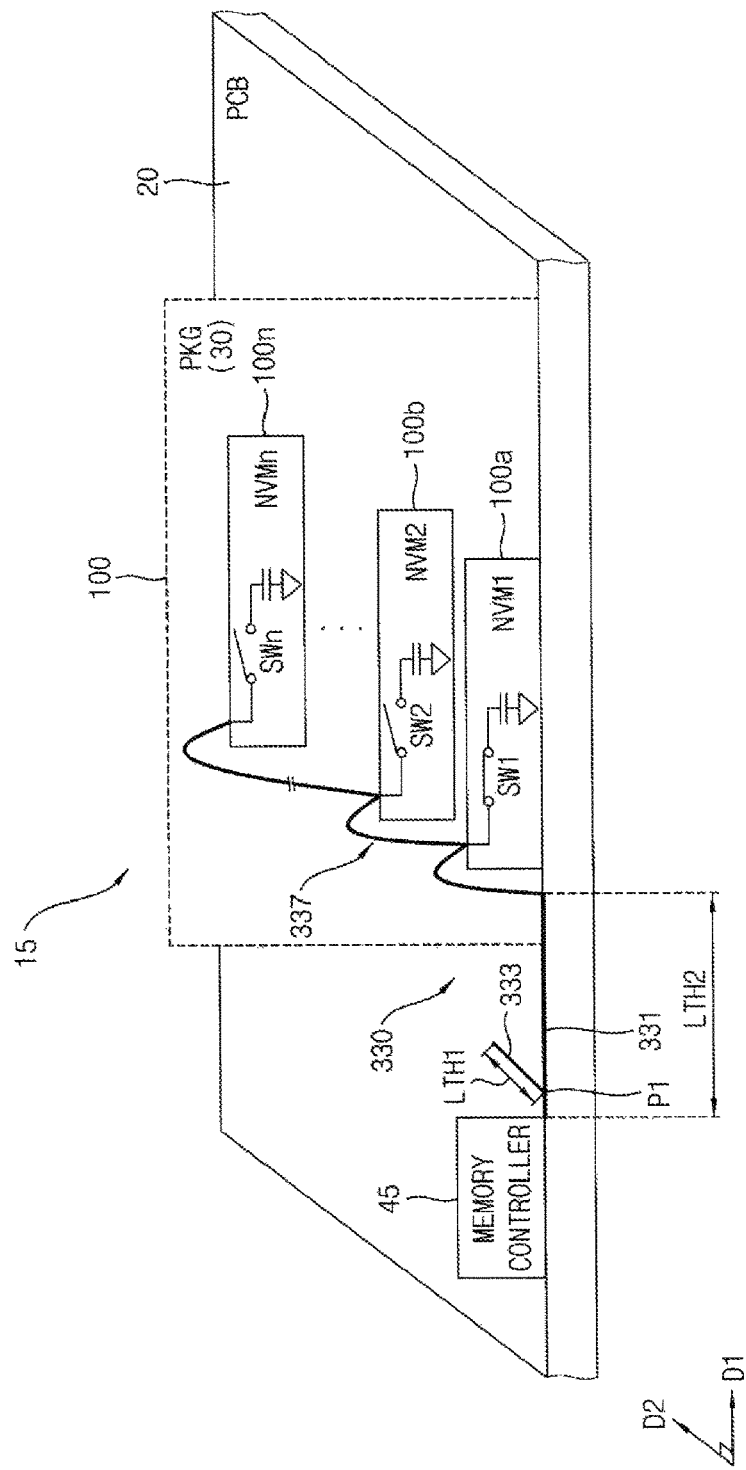
FIG. 3 is a cross-sectional view of the data storage device of FIG. 2 according to exemplary embodiments.

FIG. 3 is a cross-sectional view of the data storage device of FIG. 2 according to exemplary embodiments.

In FIG. 3, the data storage device 15 is exemplified as the data transmission line 330 of a first channel CH1 is shown.

As described with reference to FIG. 2, the data storage device 15 includes the memory controller 45 and the nonvolatile memory device 100 (e.g., 100a~100n) provided on a PCB 20. The memory controller 45 and the nonvolatile memory devices 100a~100 may be electrically coupled to each other through the data transmission line 330. The data transmission line 330 may include a main transmission pattern 331, a branch transmission pattern 337 and at least one open stub 333. The main transmission pattern 331 may be electrically connected to the memory controller 45, and the branch transmission pattern 337 may be branched from the main transmission pattern 331 and may be connected respectively to the nonvolatile memory devices 100a~100n.

The at least one open stub 333 may extend to a second direction D2 at a first position P1 on the main transmission pattern 331 which extends in a first direction D1 perpendicular to the second direction D2. A width and a length of the at least one open stub 333 may be determined based on a width and a length of the main transmission pattern 331. A length LTH1 of the open stub 333 may be 1/K (K is a natural number greater than one) of a length LTH2 of the main transmission pattern 331. Lengths LTH1 and LTH2 of the open stub 333 and main transmission pattern 331 may be the summation of the lengths of all segments of the open stub 333 and main transmission pattern 331, respectively. Thus, when the open stub 333 and main transmission pattern 331 are do not have a linear geometry, lengths LTH1 and LTH2 of the open stub 333 and main transmission pattern 331 will be greater than a distance between the endpoints of the open stub 333 and main transmission pattern 331. In this example, the open stub 333 and main transmission pattern 331 are linear but may have other types of geometries in other implementations. Endpoints of the main transmission pattern 331 may be considered as the termination of the conductive element(s) forming the main transmission pattern 331 on or within PCB 20. The main transmission pattern 331 may be fully formed within and/or on the PCB as part of the PCB. For example, the endpoints of the main transmission pattern 331 may corresponding to two bonding pads formed on the surface of the PCB 20, one bonding pad being connected to a chip pad of memory controller 40 (e.g., via a bonding wire or a solder bump or solder ball) and the other bonding pad being connected to one or more chip pads of the nonvolatile memories 100a, 100b, . . . 100n (e.g., via a bonding wire(s) and/or a solder bump or solder ball). The stub may also constitute wiring of the PCB and may have one end at the location where the stub conductor contact the main transmission pattern 331 extending between the memory controller 40 and the package 30 and may have another end that is dangling, or not electrically connected to any other electrically conductive elements (other than the main transmission pattern 331), such as shown in FIG. 1.

The width and the length of the at least one open stub 333 and a position at which the at least one open stub 333 is branched from the main transmission pattern 331 may be determined through simulation based on a number of the nonvolatile memory devices 100a~100n.

The nonvolatile memory devices 100a~100n may include data input/output switches SW1~SWn, respectively. In FIG. 3, it is exemplified as the data input/output switches SW1~SWn are respectively contained in the nonvolatile memory devices 100a~100n. However, the present inventive concept is not limited thereto. For example, the data input/output switches SW1~SWn may be located external from the nonvolatile memory devices 100a~100n. The data storage device 15 turns on a data input/output switch of a selected nonvolatile memory device (e.g., 100a) associated with a read or write operation or a copy-back operation, etc. The data storage device 15 turns on or off data input/output switches of unselected nonvolatile memories (e.g., 100b~100n) not associated with a read or write operation or a copy-back operation, etc.

The number of nonvolatile memory devices of which the data input/output switches are turned on or off may be adjusted to substantially equal to a prescribed capacitance value. For example, when a measured capacitance value of a channel exceeds a reference value, the data storage device 15 may turn off data input/output switches of unselected nonvolatile memories to substantially equal to the reference value. When the measured capacitance value of the channel is smaller than the reference value, the data storage device 15 may turn on data input/output switches of unselected nonvolatile memories to substantially equal to the reference value.

The data input/output switches may increase parasitic capacitance of the nonvolatile memories. However, by selectively turning on the data input/output switches of unselected nonvolatile memory devices such that the capacitance value of the channel substantially equals to the reference value, it is possible to overcome an increase in capacitance due to the added data input/output switch. Thus, signal integrity and reliability of the data storage device 15 may be increased.

Figure 4:
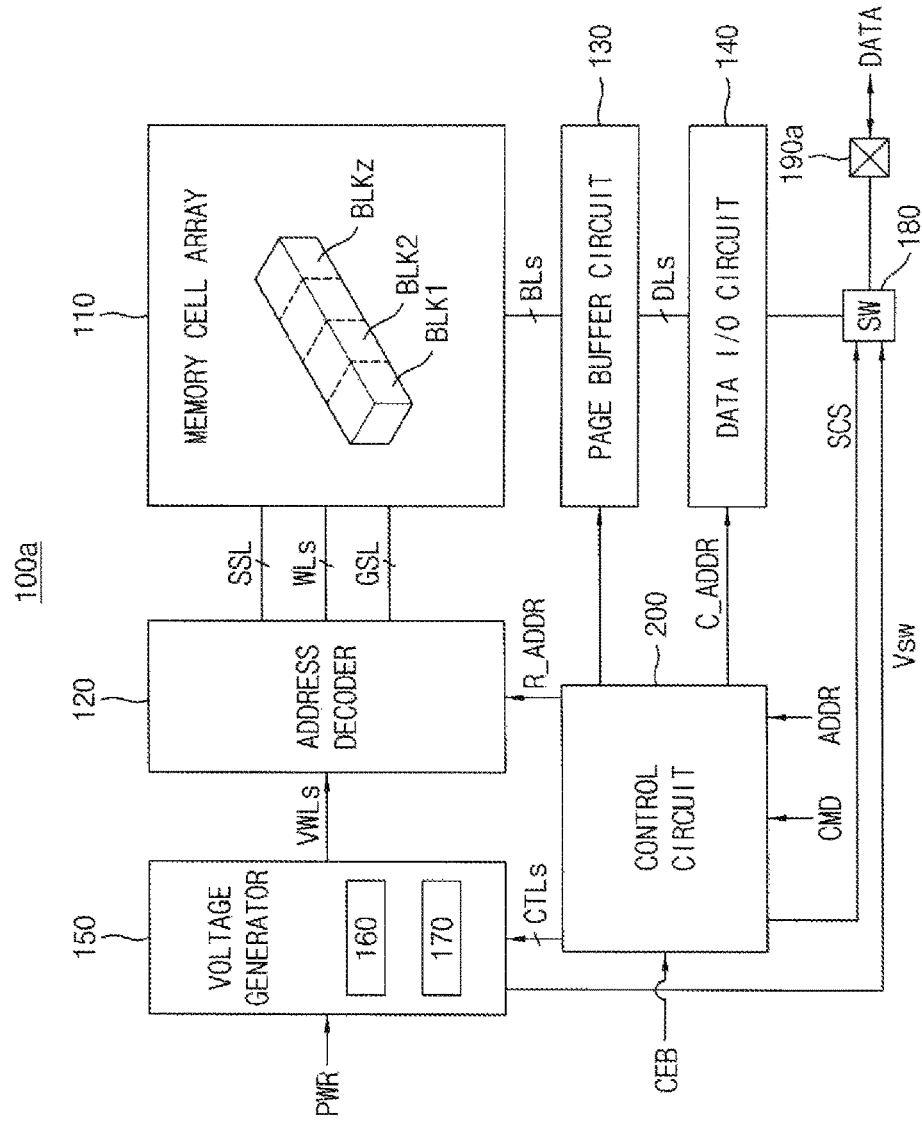
FIG. 4 is a block diagram illustrating one of the nonvolatile memory devices in the data storage device of FIG. 3 according to exemplary embodiments.

FIG. 4 is a block diagram illustrating one of the nonvolatile memory devices in the data storage device of FIG. 3 according to exemplary embodiments.

Referring to FIG. 4, the nonvolatile memory device 100a includes the memory cell array 110, an address decoder 120, a page buffer circuit 130, a data input/output circuit 150, a control circuit 200, a voltage generator 150, a data input/output switch 180, and a data input/output pad 190a. The nonvolatile memory device 100a of FIG. 4 is the same as the nonvolatile memory device 100a of FIG. 1 with the exception of the data input/output switch 180.

The memory cell array 110 may be coupled to the address decoder 120 through at least one string selection line SSL, a plurality of word-lines WLs, and at least one ground selection line GSL. In addition, the memory cell array 110 may be coupled to the page buffer circuit 130 through a plurality of bit-lines BLs.

The memory cell array 110 may include a plurality memory blocks BLK1~BLKz. Each of the memory blocks BLK1~BLKz includes a plurality of memory cells coupled to the plurality of word-lines WLs and the plurality of bit-lines BLs.

In some exemplary embodiments, the memory cell array 110 may be a three-dimensional memory cell array, which is formed on a substrate in a three-dimensional structure (or a vertical structure). In this case, the memory cell array 110 may include vertical cell strings that are vertically oriented such that at least one memory cell is located over another memory cell. The following patent documents, which are hereby incorporated by reference, describe suitable configurations for three-dimensional memory cell arrays: U.S. Pat. Nos. 7,679,133; 8,553,466; 8,654,587; 8,559,235; and US Pat. Pub. No. 2011/0233648.

In other exemplary embodiments, the memory cell array 110 may be a two-dimensional memory cell array, which is formed on a substrate in a two-dimensional structure (or a horizontal structure).

The data input/output switch 180 may be similar to or the same as the data input/output switch SW1 of FIG. 3.

The data input/output pad 190a may be connected to the transmission line TL described herein to transfer data between the memory controller 45 and the nonvolatile memory devices 100a~100n. In detail, the data input/output pad 190a of the nonvolatile memory device 100a is connected to the second end of the branch wire 70a of FIG. 1.

Figure 5:
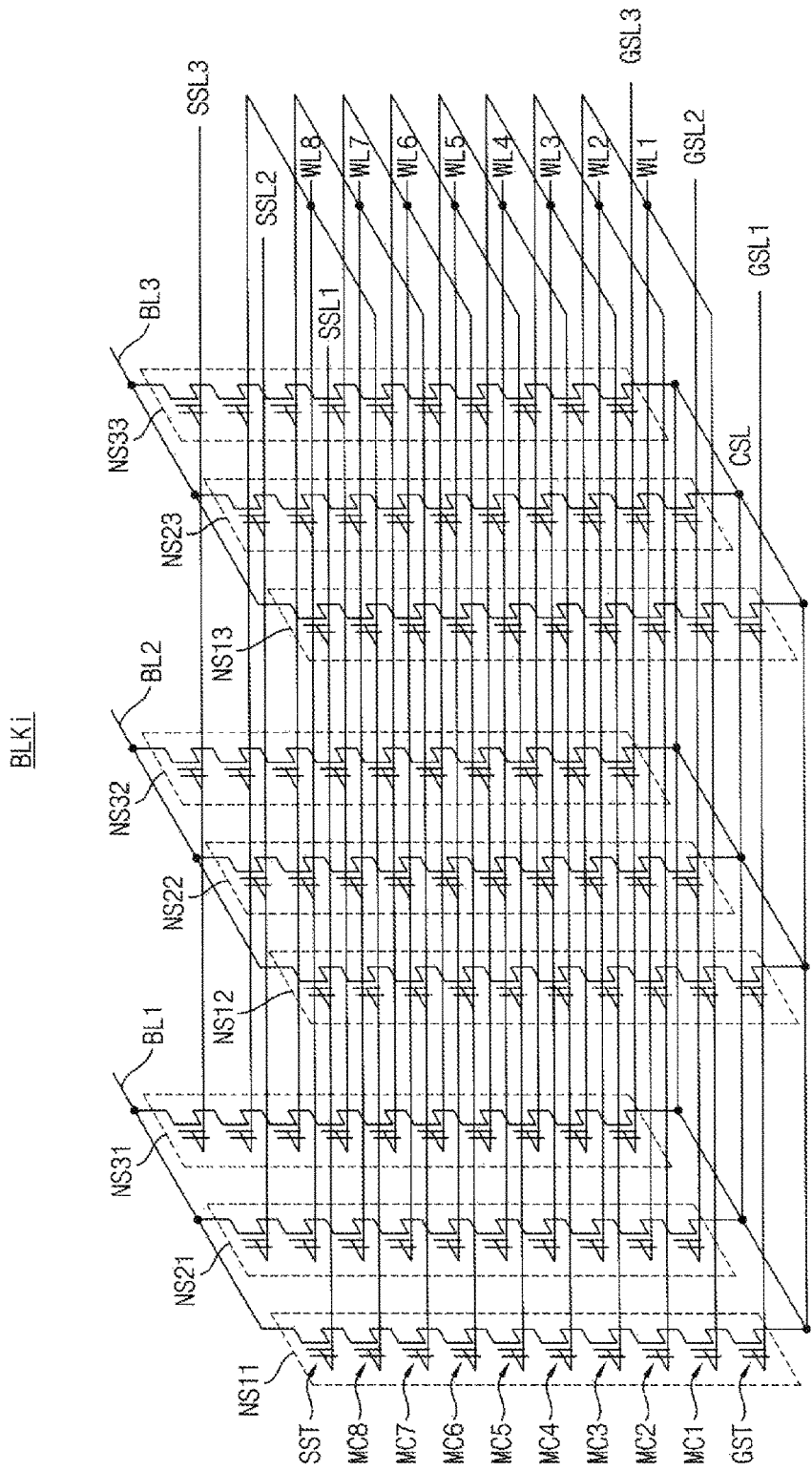
FIG. 5 is a circuit diagram illustrating an equivalent circuit of one of the memory blocks in FIG. 4.

FIG. 5 is a circuit diagram illustrating an equivalent circuit of one of the memory blocks in FIG. 4.

The memory block BLKi of FIG. 5 may be formed on a substrate in a three-dimensional structure (or a vertical structure). For example, a plurality of cell strings included in the memory block BLKi may be formed in a direction perpendicular to the substrate.

Referring to FIG. 5, the memory block BLKi may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 5, each of the memory cell strings NS11 to NS33 is illustrated to include eight memory cells MC1 to MC8. However, exemplary embodiments are not limited thereto. In some exemplary embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL. The bit-lines BL1, BL2 and BL3 may be coupled to corresponding page buffers PB1, PB2 and PB3 of the page buffer circuit 130 of FIG. 4.

In FIG. 5, each of the memory cell strings NS11 to NS33 is illustrated to include one string selection transistor SST and one ground selection transistor GST. However, exemplary embodiments are not limited thereto. In some exemplary embodiments, each of the memory cell strings NS11 to NS33 may include two or more string selection transistors and two or more ground selection transistors.

Word-lines (e.g., WL1) having the same height may be commonly connected, and the ground selection lines GSL1 to GSL3 and the string selection lines SSL1 to SSL3 may be separated. In FIG. 5, the memory block BLKa is illustrated to be coupled to eight word-lines WL1 to WL8 and three bit-lines BL1 to BL3. However, exemplary embodiments are not limited thereto. In some exemplary embodiments, the memory block BLKa may be coupled to any number of word-lines and bit-lines.

Referring again to FIG. 4, the control circuit 200 may receive a command signal CMD and an address signal ADDR from an external device (e.g., the memory controller 45), and control an erase loop, a program loop, a dummy program operation and a read operation of the nonvolatile memory device 100a based on the command signal CMD and the address signal ADDR. The program loop may include a program operation and a program verification operation. The erase loop may include an erase operation, an erase verification operation at least one sensing operation.

For example, the control circuit 200 may generate control signals CTLs, which are used for controlling the voltage generator 150, based on the command signal CMD, and generate a row address R_ADDR and a column address C_ADDR based on the address signal ADDR. The control circuit 200 may provide the row address R_ADDR to the address decoder 120 and provide the column address C_ADDR to the data input/output circuit 140. The control circuit 200 receives a chip enable signal CEB from the memory controller 45 and activates the nonvolatile memory device 100a.

The control circuit 200 adjusts a level of a voltage to be provided to the data input/output switch 180 to turn on the data input/output switch 180. For example, the control circuit 200 may turn on the data input/output switch 180 while the chip enable signal CEB for activating the nonvolatile memory 100a is activated. In some embodiments, a period of time during which the data input/output switch 180 is turned on may be somewhat delayed compared with a period of time during which the chip enable signal CEB is activated. The control circuit 200 makes the chip enable signal CEB from the memory controller 45 bypassed to the data input/output switch 180. The control circuit 200 responds to the chip enable signal CEB to generate a switch control signal SCS for controlling the data input/output switch 180.

The address decoder 120 may be coupled to the memory cell array 110 through the at least one string selection line SSL, the plurality of word-lines WLs, and the at least one ground selection line GSL. During the program operation or the read operation, the address decoder 120 may determine one of the plurality of word-lines WLs as a selected word-line and determine rest of the plurality of word-lines WLs except for the first word-line as unselected word-lines based on the row address R_ADDR.

The voltage generator 150 may generate word-line voltages VWLs, which are required for the operation of the nonvolatile memory device 100a, based on the control signals CTLs. The word-line voltages VWLs may be applied to the plurality of word-lines WLs through the address decoder 120.

For example, during the erase operation, the voltage generator 150 may apply an erase voltage to a well of the memory block and may apply a ground voltage to entire word-lines of the memory block. During the erase verification operation, the voltage generator 150 may apply an erase verification voltage to the entire word-lines of the memory block or sequentially apply the erase verification voltage to word-lines in a word-line basis.

For example, during the program operation, the voltage generator 150 may apply a program voltage to the selected word-line and may apply a program pass voltage to the unselected word-lines. In addition, during the program verification operation, the voltage generator 150 may apply a program verification voltage to the selected word-line and may apply a verification pass voltage to the unselected word-lines.

For example, during the read operation, the voltage generator 150 may apply a read voltage to the selected word-line and may apply a read pass voltage to the unselected word-lines.

The voltage generator 150 contains an operating voltage generator 160 and a switching voltage generator 170. The operating voltage generator 160 may generate operating voltages required for described operation and the switching voltage generator 170 may generate a switching voltage Vsw for turning-on the data input/output switch 180.

The page buffer circuit 130 may be coupled to the memory cell array 110 through the plurality of bit-lines BLs. The page buffer circuit 130 may include a plurality of page buffers. In some exemplary embodiments, one page buffer may be connected to one bit-line. In other exemplary embodiments, one page buffer may be connected to two or more bit-lines.

The page buffer circuit 130 may temporarily store data to be programmed in a selected page or data read out from the selected page.

The data input/output circuit 140 may be coupled to the page buffer circuit 130 through data lines DLs. During the program operation, the data input/output circuit 140 may receive program data DATA from an external device (e.g., the memory controller 45) and provide the program data DATA to the page buffer circuit 130 based on the column address C_ADDR received from the control circuit 200. During the read operation, the data input/output circuit 140 may provide read data DATA, which are stored in the page buffer circuit 130, to the external device based on the column address C ADDR received from the control circuit 200.

In addition, the page buffer circuit 130 and the data input/output circuit 140 read data from a first area of the memory cell array 110 and write the read data to a second area of the memory cell array 110. That is, the page buffer circuit 130 and the data input/output circuit 140 may perform a copy-back operation.

Figure 6:
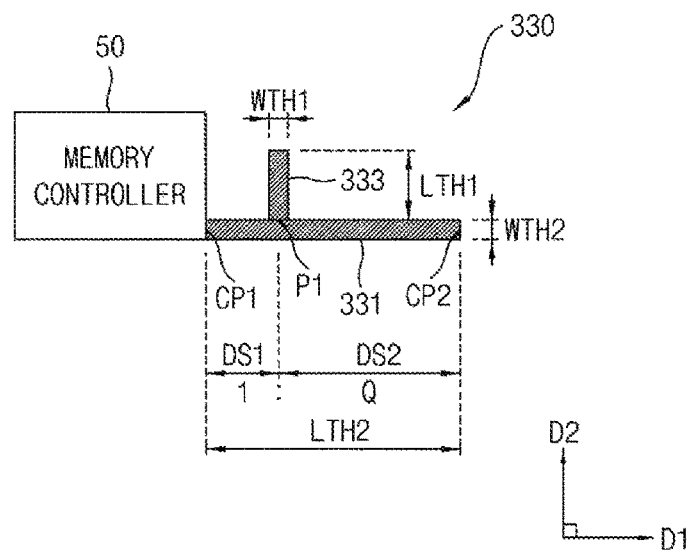
FIG. 6 illustrates an example of the data transmission line in the data storage device of FIG. 3 according to exemplary embodiments.

FIG. 6 illustrates an example of the data transmission line in the data storage device of FIG. 3 according to exemplary embodiments.

Referring to FIG. 6, the data transmission line 330 may include the main transmission pattern 331 and the open stub pattern 331. The open stub 333 may have a first length LTH1 and a first width WTH1. The main transmission pattern 331 may have a second length LTH2 and a second width WTH2. The open stub 333 may extend to the second direction D2 at a first position P1 in the main transmission pattern 331 which extends in the first direction D1 perpendicular to the second direction D1. The first position P1 may be a position which divide the main transmission pattern 331 with a ratio of 1:Q (Q is a natural number greater than one) from a first connection point CP1 at which the main transmission pattern 331 is connected to the memory controller 45 to a second connection point CP2 at which the main transmission pattern 331 is connected to the branch transmission pattern 337.

The first length LTH1 of the open stub 333 may be 1/K (K is a natural number greater than one) of the length LTH2 of the main transmission pattern 331 and the first width WTH1 of the open stub 333 may be K times greater than the width WTH2 of the main transmission pattern 331. In example embodiments, the first width WTH1 of the open stub 333 may be 1/K times of the width WTH2 of the main transmission pattern 331.

A distance from the first connection point CP1 to the first position P1 corresponds to a first distance DS1 and a distance from the first position P1 to the second connection point CP2 corresponds to a second distance DS2. The first distance DS1 may be smaller than the second distance DS2.

Figure 7:
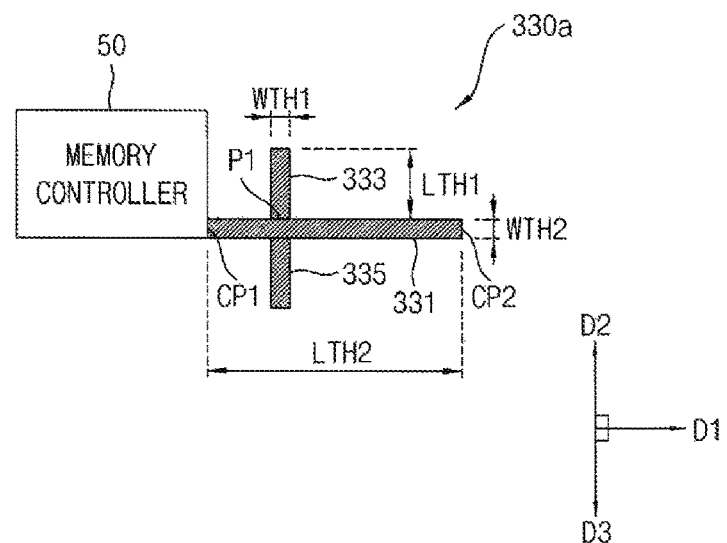
FIG. 7 illustrates an example of the data transmission line in the data storage device of FIG. 3 according to exemplary embodiments.

FIG. 7 illustrates an example of the data transmission line in the data storage device of FIG. 3 according to exemplary embodiments.

Referring to FIG. 7, a data transmission line 330a may include the main transmission pattern 331, a first open stub pattern 333 and a second open stub pattern 335. The first open stub pattern 333 extends to the second direction D2 at the first position P1 and the second open stub pattern 335 extends to a third direction D3 opposite to the second direction D2 at the first position P1.

Each of the first open stub pattern 333 and second open stub pattern 335 may have a first length LTH1 and a first width WTH1.

Figure 8:
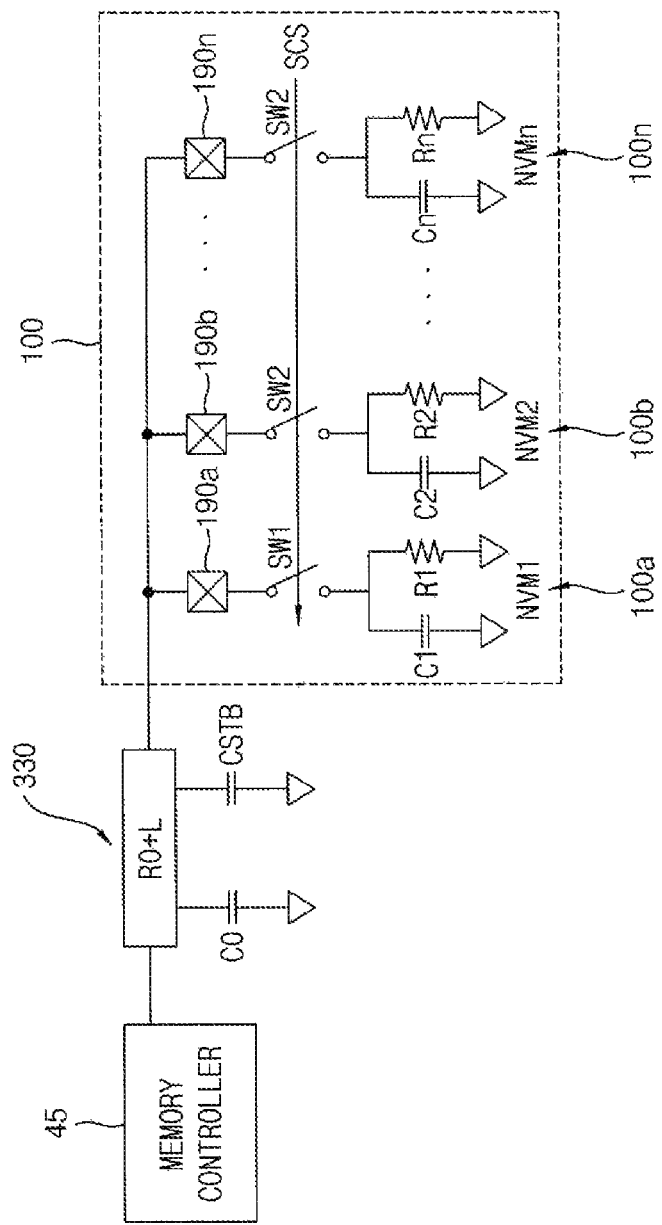
FIG. 8 is a diagram showing equivalent circuit modeling of the data storage device of FIG. 3 according to exemplary embodiments.

FIG. 8 is a diagram showing equivalent circuit modeling of the data storage device of FIG. 3 according to exemplary embodiments.

For the sake of easy understanding, there are illustrated the nonvolatile memory device 100 including nonvolatile memory devices 100a~100n, respectively connected in common to a channel CHL a memory controller 45, and the data transmission line 330. Each of the remaining channels (e.g., CH2 through CHi) not shown may be connected to a plurality of nonvolatile memory devices.

For example, the nonvolatile memory devices 100a~100n are stacked in the form of multi-stack chip. The nonvolatile memory devices 100a~100n are connected to the data transmission line 330 through pads 190a~190n, respectively. Capacitances C1~Cn and resistances R1~Rn included in the nonvolatile memory devices 100a~100n represent resistances and capacitances of data input/output switches 180 (refer to FIG. 4) and data input/output circuits 140 (refer to FIG. 4). Although not shown in FIG. 8, inductance may be present. An exemplary embodiment is exemplified as the data transmission line 330 has resistance R0, inductance L, capacitance C0 and capacitance CSTB. The capacitance CSTB represents capacitance of the open stub 333.

The data input/output switches SW1~SWn are controlled by a switch control signal SCS that is generated in response to a chip enable signal CEB. In some embodiments, the data input/output switches SW1~SWn are controlled by a chip enable signal CEB that control circuit 200 (refer to FIG. 4) receives. For example, if the nonvolatile memory device 100a is selected by the chip enable signal CEB, the chip enable signal CEB is bypassed to the data input/output switch SW1 under the control of the control circuit 200. A period during which the data input/output switch SW1 is turned on is substantially concurrent with a period during which the chip enable signal CEB is activated. In some embodiments, a period during which the data input/output switch SW1 is turned on may be somewhat delayed compared with the period during which the chip enable signal CEB is activated. If the nonvolatile memory device 100a is not selected, the data input/output switch SW1 is turned off under the control of the control circuit 200. A period during which the data input/output switch SW1 is turned off may be substantially concurrent with a period during which the chip enable signal CEB is inactivated.

When a data input/output switch of a selected nonvolatile memory device is turned on and data input/output switches of unselected nonvolatile memory devices are turned off, the impedance Zr of the nonvolatile memory devices is decreased, and the impedance of the data transmission line 330 is increased due to the capacitance CSTB of the open stub 333. Therefore, the reflection coefficient Γ is decreased to decrease reflection phenomenon. Accordingly, signal integrity may be enhanced.

When the data is transmitted at high speed from the memory controller 45 to the nonvolatile memory device 100, signal transmission characteristic is enhanced due to the at least one open stub 333. Therefore, a write margin of a nonvolatile memory device of the nonvolatile memory device 100, which performs a program operation, may be increased. Therefore, performance of the data storage device 15 may be enhanced.

A data input/output switch of an unselected nonvolatile memory device is always not turned off, but it may be turned on or off such that a measured channel-capacitance value substantially equals a reference value. For example, when a measured channel-capacitance value exceeds a reference value, data input/output switches (of which the number is predetermined) may be turned off such that the channel-capacitance value substantially equals the reference value. When the measured channel-capacitance value is smaller than the reference value, data input/output switches of which the number is predetermined may be turned on such that the channel-capacitance value substantially equals the reference value.

Figure 9:
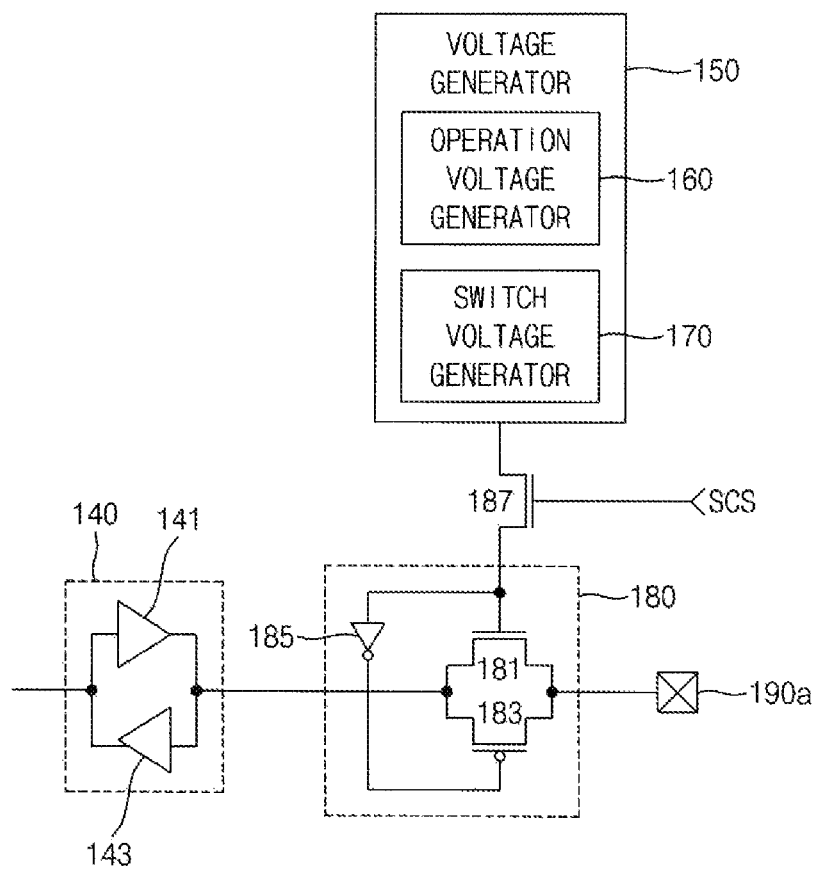
FIG. 9 illustrates the data input/output switch in the data storage device according to exemplary embodiments.

FIG. 9 illustrates the data input/output switch in the data storage device according to exemplary embodiments.

Referring to FIG. 9, the data input/output switch 180 is connected between the data input/output circuit 140 and a pad 190a. The data input/output circuit 140 includes a driver 141 to drive data to be transmitted to the memory controller 45 through the pad 190a and a receiver 143 to receive data provided from the memory controller 45 through the pad 190a. The data input/output switch 180 is turned on or off in response to a control of control circuit 200 (refer to FIG. 4).

For example, a transistor 187 that operates in response to a switch control signal SCS or a chip enable signal CEB is coupled between a voltage generator 150 and the data input/output switch 180. The control circuit 200 may generate the switch control signal SCS in response to the chip enable signal CEB, for example. A delay may exist between an active period of the chip enable signal CEB and an active period of the switch control signal SCS. In some embodiments, under a control of the control circuit 200, the chip enable signal CEB is provided to the transistor 187 while a nonvolatile memory device is activated in response to the chip enable signal CEB. If the transistor 187 is turned on in response to the switch control signal SCS or the chip enable signal CEB, an operating voltage or the switching voltage Vsw may be applied to the data input/output switch 180.

The data input/output switch 180 includes a transmission gate structure in which at least one NMOS transistor 181 and at least one PMOS transistor 183 are connected in parallel. An inverter 185 is placed between the NMOS transistor 181 and the PMOS transistor 183. In FIG. 9, the inverter 185 is placed in the data input/output switch 180. However, the inventive concept is not limited thereto. For example, the inverter 185 may be disposed external from the data input/output switch 180. The data input/output switch 180 may be implemented with only one NMOS transistor.

Figure 10A:
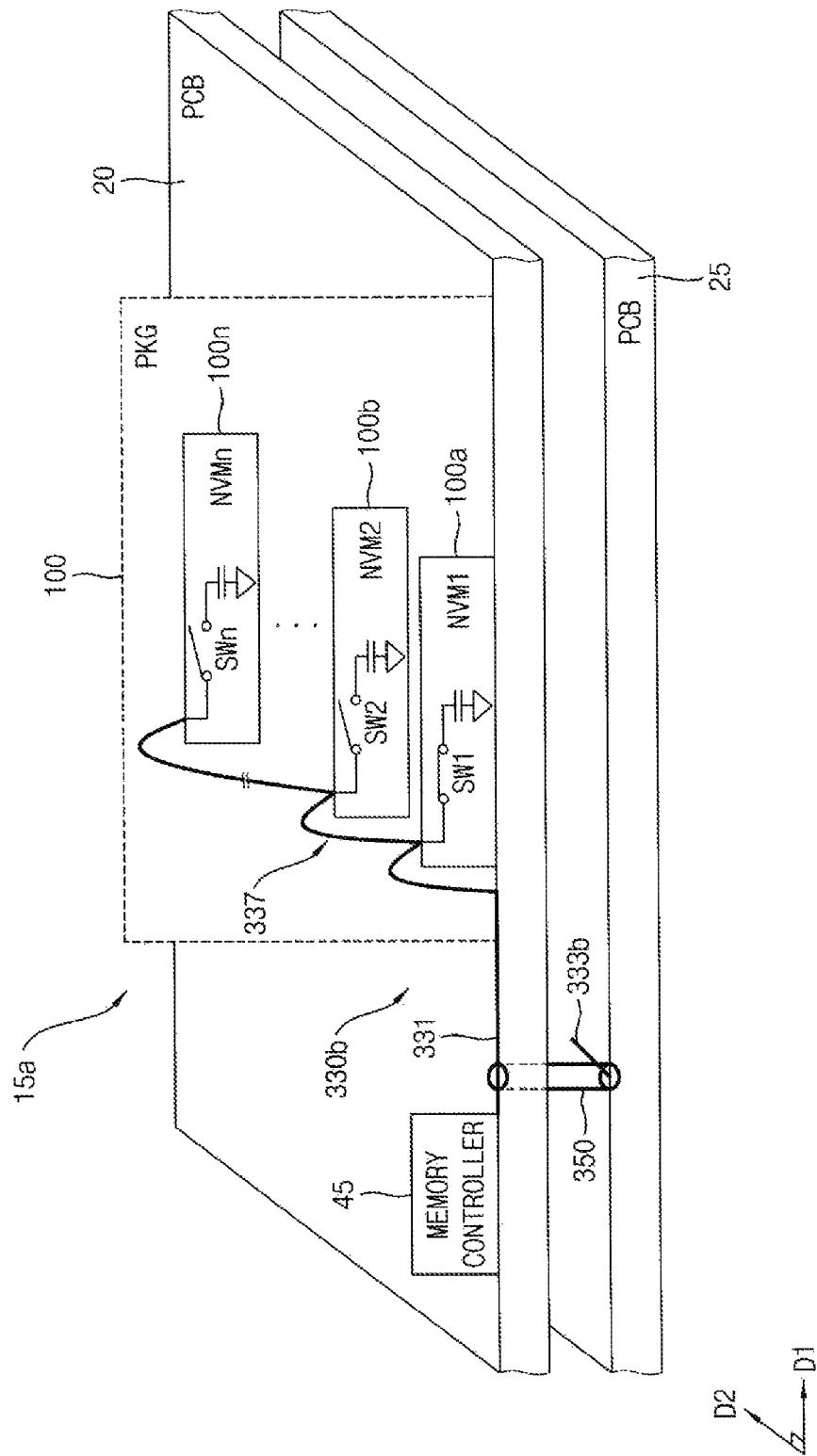
FIG. 10A is a cross-sectional view illustrating an example of the data storage device of FIG. 2 according to exemplary embodiments.

FIG. 10A is a cross-sectional view illustrating an example of the data storage device of FIG. 2 according to exemplary embodiments.

A data storage device 15a of FIG. 10A differs from the data storage device 15 of FIG. 3 in that the data storage device 15a includes a data transmission line 330b instead of the data transmission line 330.

Referring to FIG. 10A, the data storage device 15a may include a first PCB 20, a second PCB 25, the memory controller 45, the nonvolatile memory device 100 and the data transmission line 330b. The nonvolatile memory device 100 may include the nonvolatile memory devices 100a~100n. The data transmission line 330b may include a main transmission pattern 331, a branch transmission pattern 337 and at least one open stub 333b. The main transmission pattern 331 may be electrically connected to the memory controller 45, and the branch transmission pattern 337 may be branched from the main transmission pattern 331 and may be connected respectively to the nonvolatile memory devices 100a~100n.

The main transmission pattern 331 and the branch transmission pattern 337 may be provided on the first PCB 20, and the open stub 333b may be provided on the second PCB 25 formed in a different layer from a layer in which the first PCB 20 is formed. The main transmission pattern 331 may be coupled to the open stub 333b through a via (e.g., a through-substrate via) 350 formed through the first PCB 20. The via 350 may be formed at a first position of the main transmission pattern 331 in a first direction D1 in which the main transmission pattern 331 extends. The first position P1 may be closer to the memory controller 45 than the branch transmission pattern 337 or at least one of the nonvolatile memory devices 100a~100n.

A width and a length of the open stub 333b may be determined based on a width and a length of the main transmission pattern 331. A length of the at least one open stub 333b may be 1/K of a length of the main transmission pattern 331.

The open stub 333b may extend in a second direction D2 perpendicular to the first direction D1. Alternatively, the open stub 333b may extend in a direction opposite to the second direction.

Figure 10B:
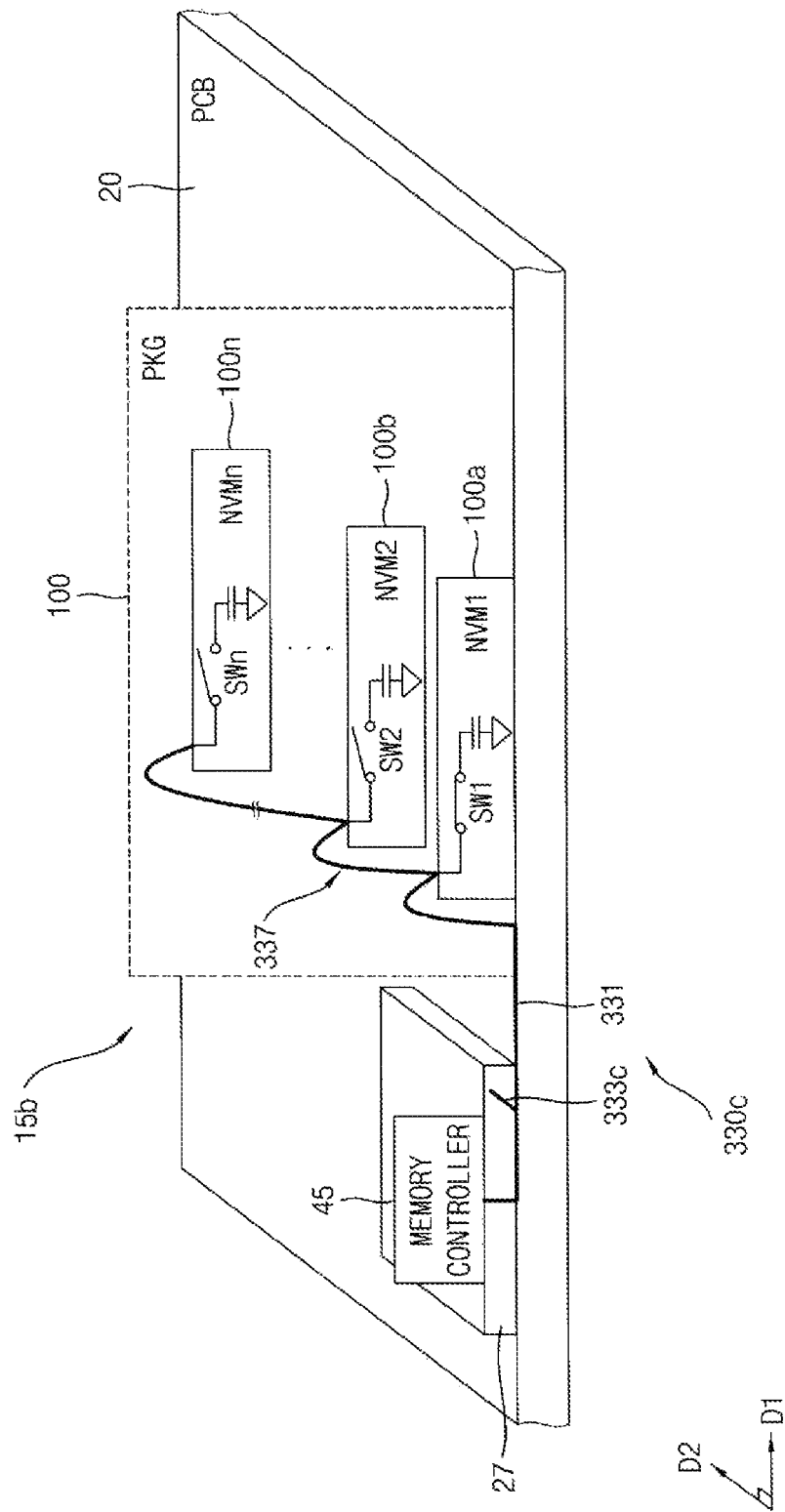
FIG. 10B is a cross-sectional view illustrating another example of the data storage device of FIG. 3 according to exemplary embodiments.

FIG. 10B is a cross-sectional view illustrating another example of the data storage device of FIG. 3 according to exemplary embodiments.

A data storage device 15b of FIG. 10B differs from the data storage device 15 of FIG. 3 in that the data storage device 15b includes a data transmission line 330c instead of the data transmission line 333.

Referring to FIG. 10B, the data storage device 15b may include an interposer 27 interposed between the first PCB 20 and the memory controller 45, and a data transmission line 330c. The data transmission line 330c may include a main transmission pattern 331, a branch transmission pattern 337 and at least one open stub 333c. The main transmission pattern 331 may be electrically connected to the memory controller 45, and the branch transmission pattern 337 may be branched from the main transmission pattern 331 and may be connected respectively to the nonvolatile memory devices 100a~100n. The open stub 333c may be formed in the interposer 27.

Figure 10C:
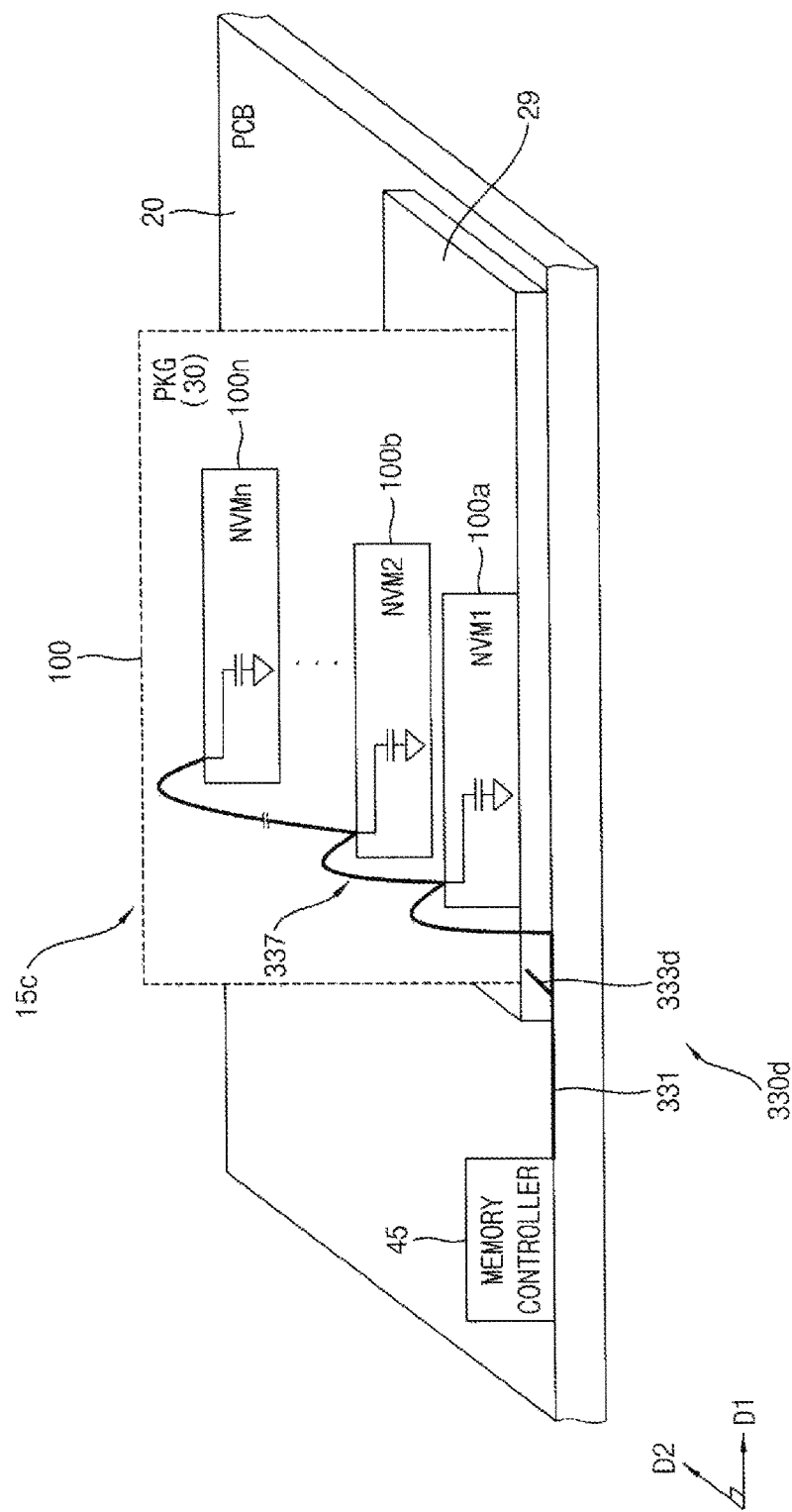
FIG. 10C is a cross-sectional view illustrating another example of the data storage device of FIG. 2 according to exemplary embodiments.

FIG. 10C is a cross-sectional view illustrating another example of the data storage device of FIG. 3 according to exemplary embodiments.

A data storage device 15c of FIG. 10C differs from the data storage device 15 of FIG. 3 in that the data storage device 15c includes a data transmission line 330d instead of the data transmission line 330.

Referring to FIG. 10C, the data storage device 15c may include an interposer 29 interposed between the first PCB 20 and the package 30, and a data transmission line 330d. The data transmission line 330d may include a main transmission pattern 331, a branch transmission pattern 337 and at least one open stub 333d. The main transmission pattern 331 may be electrically connected to the memory controller 45, and the branch transmission pattern 337 may be branched from the main transmission pattern 331 and may be connected respectively to the nonvolatile memory devices 100a~100n. The open stub 333d may be formed in the interposer 29.

As shown in FIG. 10C, a first end of the open stub 333d is connected to the main transmission pattern 331 at a position of the main transmission pattern 331. This position is closer to the branch transmission pattern 337 and/or at least one of the nonvolatile memory devices 100a~100n than the memory controller 40. In this case, the data transmission line 330d may be used to transfer data from one of the plurality of memory devices 100a~100n to the memory controller 45.

Figure 11:
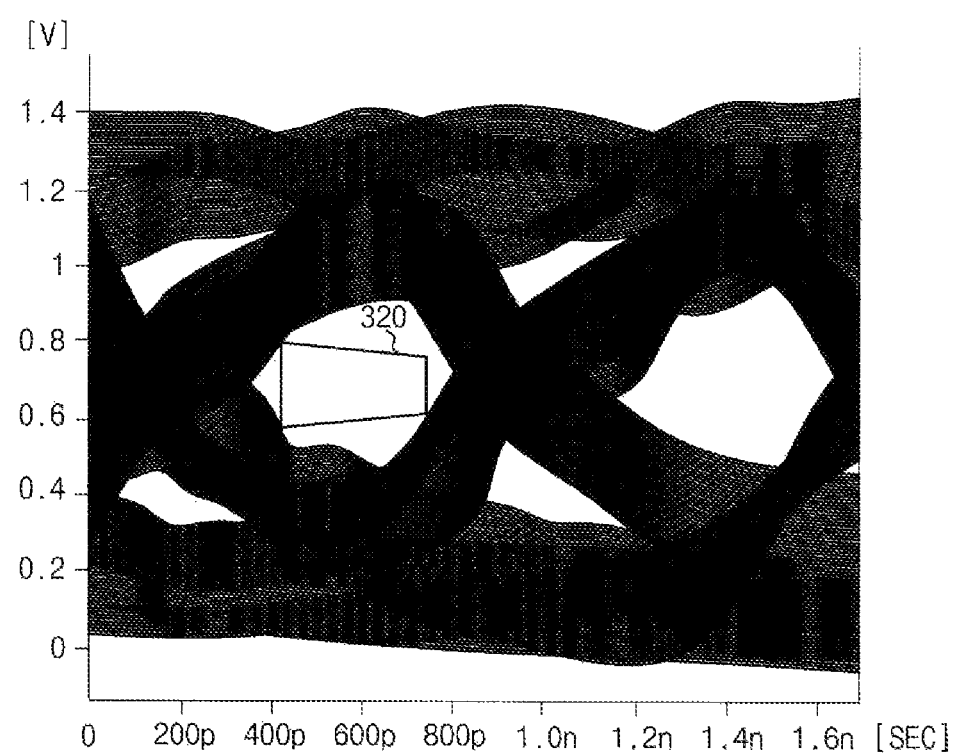
FIG. 11 illustrates an eye diagram in a nonvolatile memory device when at least one open stub is not included in the data transmission line.
Figure 12:
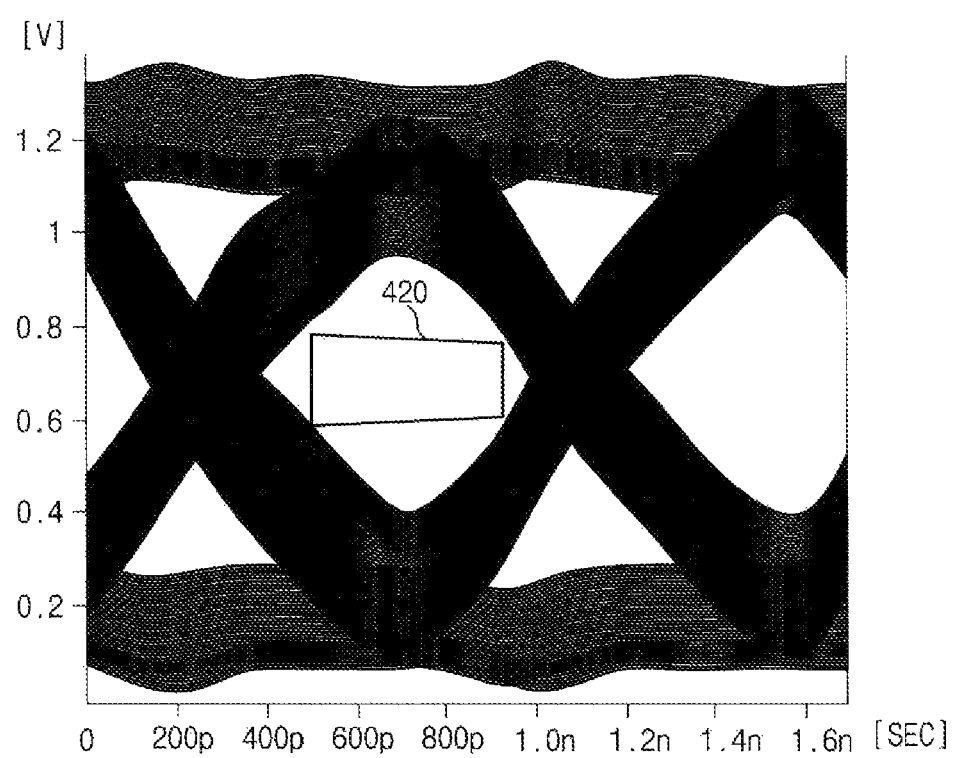
FIG. 12 illustrates an eye diagram in a nonvolatile memory device when at least one open stub is included in the data transmission line.

FIG. 11 illustrates an eye diagram in a nonvolatile memory device when at least one open stub is not included in the data transmission line, and FIG. 12 illustrates an eye diagram in a nonvolatile memory device when at least one open stub is included in the data transmission line.

Referring to FIGS. 11 and 12, an eye window 320 of a case when the data transmission line 330 does not include the at least one open stub 333 is smaller than an eye window 420 of a case when the data transmission line 330 includes the at least one open stub 333. Therefore, a signal transmission characteristic is more enhanced when the data transmission line 330 includes the at least one open stub 333 than when the data transmission line 330 does not include the at least one open stub 333.

Figure 13:
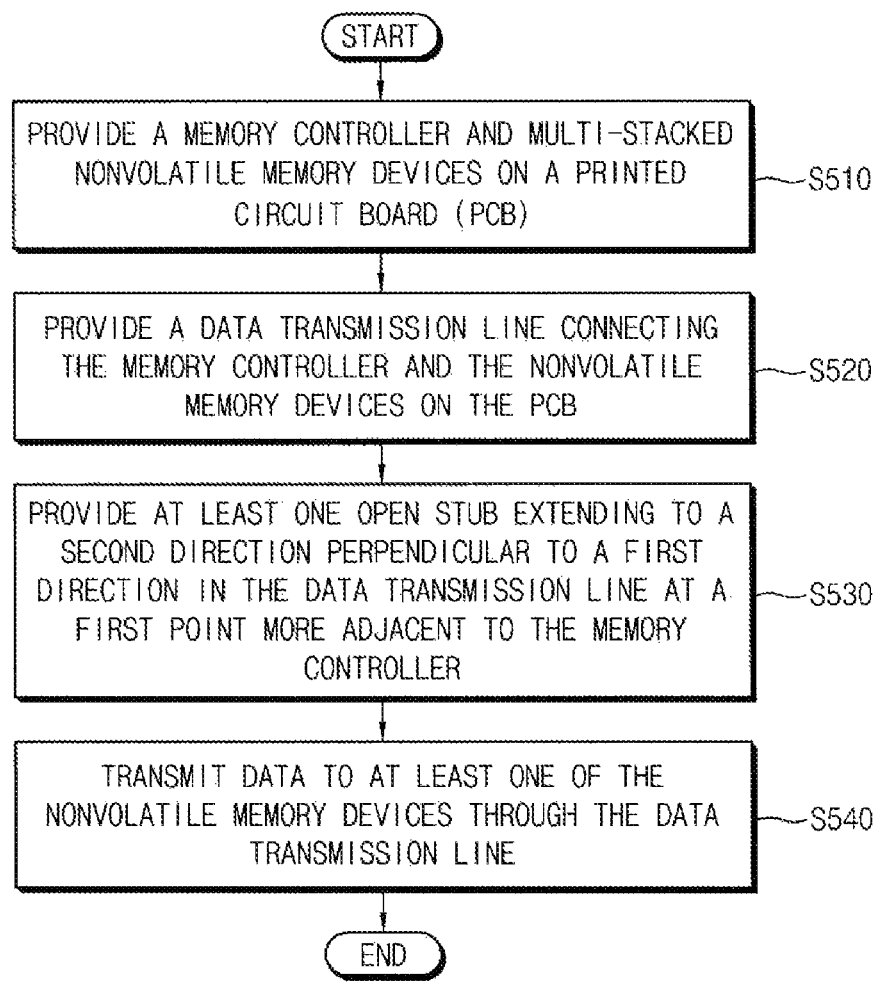
FIG. 13 is a flow chart illustrating a method of operating a data storage device according to exemplary embodiments.

FIG. 13 is a flow chart illustrating a method of operating a data storage device according to exemplary embodiments.

Referring to FIGS. 1 through 13, in a method of operating a data storage device 15, a memory controller 45 and a plurality of nonvolatile memory devices 100a~100n are provided on a first PCB 20 (S510). The nonvolatile memory devices 100a~100n may be contained in the package 30 in the form of multi-stack chip in the first PCB 20.

A data transmission line 330 electrically connecting the memory controller 45 and the nonvolatile memory devices 100a~100n is provided on the first PCB 20 (S520). The data transmission line 330 may include a main transmission pattern 331, a branch transmission pattern 337 and at least one open stub 333. The main transmission pattern 331 may be electrically connected to the memory controller 45, and the branch transmission pattern 337 may be branched from the main transmission pattern 331 and may be connected respectively to the nonvolatile memory devices 100a~100n.

At least one open stub 333 is provided, which extends to a second direction D2 at a first position P1 in the data transmission line 331 which extends in a first direction D1 perpendicular to the second direction D2 (S530). The first position P1 in the data transmission line 331 is closer to the memory controller 45 than at least one of the nonvolatile memory devices 100a~100n. A width and a length of the at least one open stub 333 may be determined based on a width and a length of the main transmission pattern 331. A length of the at least one open stub 333 may be 1/K of a length of the main transmission pattern 331.

The at least one open stub pattern 333 is provided on the first PCB 20.

The at least one open stub pattern 333b may be provided on a second PCB 25 formed in a different layer from a layer in which the first PCB 20 is formed. In this case, the at least one open stub 333b may be connected to the main transmission pattern 331 through the via 350 formed in the first PCB 20.

Data is transmitted to at least one of the nonvolatile memory devices 100a~100n from the memory controller 45 through the data transmission line 330 (S540).

Accordingly, a data transmission characteristic may be enhanced by transmitting data through a data transmission line including at least one open stub. Since the data transmission line 330 includes at least one open stub 333 which electrically connects to the memory controller 45 and the nonvolatile memory devices 100, signal transmission characteristic may be enhanced when the memory controller 45 transmits data to at least one of the nonvolatile memory devices 100a~100n. Therefore, a write margin of a nonvolatile memory device of the nonvolatile memory devices 100a~100n, which performs a program operation may be increased.

In exemplary embodiments, it is described that a data transmission line includes a least one open stub. In other exemplary embodiments, an address transmission line or a command transmission line may include at least one open stub to increase signal transmission characteristic.

Figure 14:
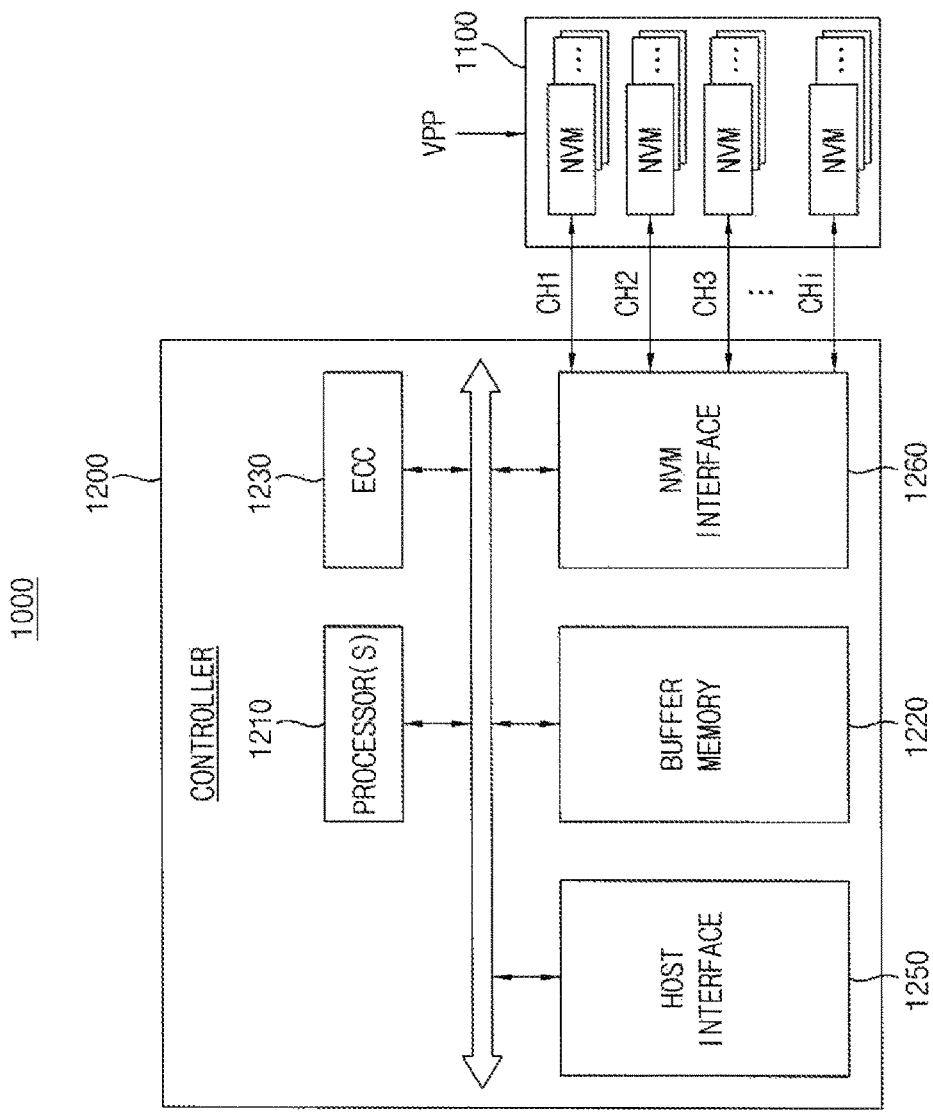
FIG. 14 is a block diagram illustrating a solid state disk or solid state drive (SSD) according to exemplary embodiments.

FIG. 14 is a block diagram illustrating a solid state disk or solid state drive (SSD) according to exemplary embodiments.

Referring to FIG. 14, SSD 1000 includes multiple nonvolatile memory devices 1100 and an SSD controller 1200.

The nonvolatile memory devices 1100 may be optionally supplied with an external high voltage VPP. Each of the nonvolatile memory devices 1100 may include the nonvolatile memory device 100a of FIG. 4. The SSD controller 1200 is connected to the nonvolatile memory devices 1100 through the data transmission line 330 in FIG. 3.

The SSD controller 1200 is connected to the nonvolatile memory devices 1100 through multiple channels CH1 to CHi. The SSD controller 1200 may include one or more processors 1210, a buffer memory 1220, an ECC block 1230, a host interface 1250, and a nonvolatile memory interface 1260.

The buffer memory 1220 stores data used to drive the SSD controller 1200. The buffer memory 1220 comprises multiple memory lines each storing data or a command.

The ECC block 1230 calculates error correction code values of data to be programmed at a writing operation and corrects an error of read data using an error correction code value at a read operation. In a data recovery operation, the ECC block 1230 corrects an error of data recovered from the nonvolatile memory devices 1100.

The host interface 1250 provides an interface with an external device. The nonvolatile memory interface 1260 provides an interface with the nonvolatile memory devices 1100.

As described above, the data storage device includes a data transmission line (or, signal transmission line) connecting a memory controller and a plurality of nonvolatile devices, which includes at least one open stub, and thus signal integrity of the data storage device may be enhanced.

The present disclosure may be applied to various electronic devices including nonvolatile memory devices. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

What is claimed is:

1. A data storage device comprising:
   a first printed circuit board (PCB) comprising a main transmission pattern formed on at least one surface of the first PCB and/or within the first PCB,
   a memory controller provided on the first PCB; and
   a plurality of nonvolatile memory devices provided on the first PCB, the plurality of nonvolatile memory devices connected to the memory controller through a channel and configured to exchange data with the memory controller,
   wherein the channel includes a data transmission line connecting data pads of the memory controller and the nonvolatile memory devices,
   wherein the data transmission line comprises the main transmission pattern, a branch transmission pattern and an open stub contacting the main transmission pattern,
   wherein the open stub does not contact any other conductor other than the main transmission pattern,
   wherein the branch transmission pattern includes a plurality of branch wires,
   wherein the main transmission pattern includes a first end contacting the memory controller and a second end contacting only a first branch wire of tihe branch transmission pattern, and
   wherein the memory controller connects to the nonvolatile memory devices through the main transmission pattern and the plurality of branch wires, which connect to each other in series.

2. The data storage device of claim 1,
   wherein the open stub comprises a first open stub pattern which extends along a second direction from a first position of the main transmission pattern,
   wherein the main transmission pattern extends in a first direction perpendicular to the second direction, and
   wherein the first position of the main transmission pattern is closer to the memory controller than the branch transmission pattern.

3. The data storage device of claim 2, wherein a length of the first open stub pattern in the second direction is 1/K of a length of the main transmission pattern in the first direction, K being a natural number greater than 1.

4. The data storage device of claim 2, further comprising:
   a second PCB connected with the first PCB through a through-substrate via,
   wherein the first open stub pattern is formed on the second PCB which is formed on a different layer from a layer in which the first PCB is formed, and the first open stub pattern is connected to the main transmission pattern through the through-substrate via formed in the first PCB.

5. The data storage device of claim 1, further comprising:
   an interposer interposed between the first PCB and the memory controller,
   wherein the at least a portion of the open stub is formed in the interposer.

6. The data storage device of claim 1, further comprising:
   an interposer interposed between the first PCB and a package containing the nonvolatile memory devices,
   wherein the at least a portion of the open stub is formed in the interposer.

7. The data storage device of claim 1, wherein the open stub comprises:
   a first open stub pattern which extends in a second direction at a first position from the main transmission pattern;
   a second open stub pattern which extends in a direction opposite to the second direction from the first position; and
   the first position of the main transmission pattern is closer two times to the memory controller than the branch transmission pattern,
   wherein the main transmission pattern extends in a first direction perpendicular to the second direction.

8. The data storage device of claim 7, wherein a length of the first open stub pattern in the second direction is 1/K times greater than a length of the main transmission pattern in the first direction, K being a natural number greater than 1.

9. The data storage device of claim 1, wherein the nonvolatile memory devices are provided in a form of multi-stacked chips on the first PCB.

10. The data storage device of claim 9, wherein each of the nonvolatile memory devices comprises:
    a memory cell array including a plurality of memory cells;
    a data input/output (I/O) circuit configured to receive data to be programmed in the memory cell array through a pad coupled to the data transmission line and configured to provide data read from the memory cell array to the pad;
a data I/O switch coupled between the pad and the data I/O circuit; and
a control circuit configured to generate a switch control signal that controls turn-on and turn-off of the data I/O switch in response to a chip enable signal.

11. The data storage device of claim 10, wherein the memory cell array includes a plurality of cell strings, and each of the plurality of cell strings includes a plurality of memory cells which are stacked vertically with respect to a substrate of each of the nonvolatile memory devices.

12. A method of operating a data storage device, the method comprising:
providing a memory controller and a plurality of nonvolatile memory devices on a first printed circuit board (PCB);
providing a data transmission line electrically connecting the memory controller and the nonvolatile memory devices on the first PCB, the data transmission line including a main transmission pattern, a branch transmission pattern and at least a first open stub; and
transmitting data to at least one of the nonvolatile memory devices from the memory controller through the data transmission line,
wherein the first open stub extends in a second direction at a first position of the data transmission line which extends in a first direction perpendicular to the second direction,
wherein the first position of the data transmission line is closer to the memory controller than the nonvolatile memory devices,
wherein the first open stub includes one end electrically connected to the first position of the data transmission line and one end open,
wherein the branch transmission pattern includes a plurality of branch wires,
wherein the main transmission pattern includes a first end contacting the memory controller and a second end contacting only a first branch wire of the branch transmission pattern, and
wherein the memory controller connects to the nonvolatile memory devices through the main transmission pattern and the plurality of branch wires, which connect to each other in series.

13. The method of claim 12, wherein the first open stub is provided on the first PCB.

14. The method of claim 12, wherein the first open stub is provided on a second PCB which is formed on a different layer from a layer in which the first PCB is formed.

15. A data storage device comprising:
a first printed circuit board (PCB) comprising a main transmission line;
a memory controller provided on the first PCB; and
a plurality of memory devices provided on the first PCB, and connected to the memory controller through a transmission line comprising the main transmission line, a branch transmission line and an open stub,
wherein the main transmission line extends in a first direction, and has a first end connected to the memory controller and a second end connected to the plurality of memory devices through the branch transmission line,
wherein the open stub extends in a second direction different from the first direction, and has a first end connected to the main transmission line at a first position of the main transmission line and a second end open,
wherein the first position is closer to the memory controller than at least one of the plurality of memory devices, or is closer to at least one of the plurality of memory devices than the memory controller,
wherein the branch transmission line includes a plurality of branch wires,
wherein the main transmission line includes a first end contacting the memory controller and a second end contacting only a first branch wire of the branch transmission line, and
wherein the memory controller connects to the memory devices through the main transmission line and the plurality of branch wires, which connect to each other in series.

16. The data storage device of claim 15, further comprising:
a through-substrate via formed in the first PCB; and
a second PCB connected with the first PCB through the through-substrate via,
wherein the open stub is formed on the second PCB which is formed on a different layer from a layer in which the first PCB is formed, and the first end of the open stub is connected to the main transmission line through the through-substrate via.

17. The data storage device of claim 15, wherein a length of the open stub in the second direction is 1/K of a length of the main transmission line in the first direction, K being a natural number greater than 2.

18. The data storage device of claim 15, wherein the main transmission line further includes a second open stub having a first end connected to the main transmission line at the first position of the main transmission line and a second end open, and
wherein the second open stub extends in a third direction opposite to the second direction.

19. The data storage device of claim 15, wherein when the first position is closer to the memory controller, a distance between the first position and the at least one of the plurality of memory devices is at least twice a distance between the first position and the memory controller, or
wherein when the first position is closer to the at least one of the plurality of memory devices, the distance between the first position and the memory controller is at least twice the distance between the first position and at least one of the plurality of memory devices.

* * * * *